(12) United States Patent
An et al.

(10) Patent No.: US 10,768,880 B2
(45) Date of Patent: Sep. 8, 2020

(54) SMART FOLDER DEVICE FOR PERFORMING DISPLAY AND COPY OF DIGITAL CONTENTS, AND SMART FOLDER MANAGEMENT SYSTEM

(71) Applicant: GLOBIS INFOTECH, Seoul (KR)

(72) Inventors: Tae Hwan An, Seoul (KR); Sueng Eun Chung, Seoul (KR)

(73) Assignee: GLOBIS INFOTECH, Seoul (KR)

(*) Notice: Subject to any disclaimer, the term of this patent is extended or adjusted under 35 U.S.C. 154(b) by 0 days.

(21) Appl. No.: 16/344,464

(22) PCT Filed: Oct. 24, 2017

(86) PCT No.: PCT/KR2017/011790
§ 371 (c)(1),
(2) Date: Apr. 24, 2019

(87) PCT Pub. No.: WO2018/080143
PCT Pub. Date: May 3, 2018

(65) Prior Publication Data
US 2019/0272137 A1    Sep. 5, 2019

(30) Foreign Application Priority Data
Oct. 24, 2016 (KR) .................. 10-2016-0138470

(51) Int. Cl.
*G06F 3/14* (2006.01)
*G06F 21/32* (2013.01)
(Continued)

(52) U.S. Cl.
CPC .......... *G06F 3/1423* (2013.01); *G06F 3/0481* (2013.01); *G06F 3/0486* (2013.01);
(Continued)

(58) Field of Classification Search
CPC .. G06F 3/04817; G06F 3/0482; G06F 3/0488; G06F 3/04886; G06F 3/0486;
(Continued)

(56) References Cited

U.S. PATENT DOCUMENTS 6,116,651 A * 9/2000 Makofsky ................ B42F 7/06
281/29
2005/0246621 A1* 11/2005 Ogawa ..................... G06F 3/147
715/277
(Continued)

FOREIGN PATENT DOCUMENTS

JP          2006-039834 A      2/2006
JP          2006039834 A *     2/2006
(Continued)

OTHER PUBLICATIONS

International Search Report for PCT/KR2017/011790 dated Feb. 9, 2018 from Korean Intellectual Property Office.

*Primary Examiner* — Dong Hui Liang
(74) *Attorney, Agent, or Firm* — Paratus Law Group, PLLC

(57) ABSTRACT

Disclosed is a smart folder device for displaying and copying digital content including: a screen folder on which digital content is displayed and including a folder structure having a cover front surface, a cover rear surface, a cover side surface, a cover first inner surface, a cover second inner surface, and a pocket surface; and a piece of screen paper which is implemented in a paper form in which digital content is displayed, is inserted between the pocket surface and the cover second inner surface of the screen folder, wirelessly communicates with the screen folder, and transmits digital content to the screen folder or receives digital content from the screen folder to store and display digital content.

13 Claims, 12 Drawing Sheets

(51) Int. Cl.
  *G06K 7/10* (2006.01)
  *G09G 3/20* (2006.01)
  *G06F 3/0488* (2013.01)
  *G06K 9/00* (2006.01)
  *G06F 3/0484* (2013.01)
  *G06F 3/0481* (2013.01)
  *G06F 3/0486* (2013.01)
  *G06F 40/166* (2020.01)

(52) U.S. Cl.
  CPC ........ *G06F 3/0488* (2013.01); *G06F 3/04817* (2013.01); *G06F 3/04845* (2013.01); *G06F 3/04886* (2013.01); *G06F 3/14* (2013.01); *G06F 21/32* (2013.01); *G06K 7/10* (2013.01); *G06K 7/10366* (2013.01); *G06K 9/00087* (2013.01); *G09G 3/2096* (2013.01); *G06F 40/166* (2020.01); *G09G 2354/00* (2013.01); *G09G 2370/16* (2013.01); *G09G 2380/02* (2013.01)

(58) Field of Classification Search
  CPC .......... G06F 9/451; G06F 16/10; G06F 21/32; G06F 21/6218; G06F 21/6245; G06F 21/74; G06F 21/445; G06F 2221/2141; G06F 11/2082; G06F 16/93; G06F 3/1454; H04L 67/1095; H04L 67/10; H04L 67/104; H04L 67/1097; H04L 67/306; H04L 12/189; G09G 2370/16; G09G 2380/02
  See application file for complete search history.

(56) References Cited

U.S. PATENT DOCUMENTS

| | | | |
|---|---|---|---|
| 2006/0017659 A1* | 1/2006 | Ogawa | B41J 3/46 345/30 |
| 2010/0313161 A1* | 12/2010 | Le Chevalier | G06F 11/3476 715/781 |
| 2011/0050544 A1* | 3/2011 | Tomono | G09G 5/006 345/1.3 |
| 2015/0145846 A1* | 5/2015 | Takeuchi | B41J 3/4076 345/211 |

FOREIGN PATENT DOCUMENTS

| | | |
|---|---|---|
| JP | 2013-114016 A | 6/2013 |
| KR | 10-2014-0042425 A | 4/2014 |
| KR | 10-2014-0055783 A | 5/2014 |
| KR | 10-1475736 B1 | 12/2014 |

* cited by examiner

SMART FOLDER DEVICE FOR PERFORMING DISPLAY AND COPY OF DIGITAL CONTENTS, AND SMART FOLDER MANAGEMENT SYSTEM

CROSS-REFERENCE TO PRIOR APPLICATIONS

This application is a National Stage Patent Application of PCT International Patent Application No. PCT/KR2017/011790 (filed on Oct. 24, 2017) under 35 U.S.C. § 371, which claims priority to Korean Patent Application No. 10-2016-0138470 (filed on Oct. 24, 2016), which are all hereby incorporated by reference in their entirety.

BACKGROUND

The present invention relates to a smart folder device and a smart folder management system, and more specifically, to a smart folder device capable of displaying and copying digital contents and a smart folder management system capable of individually managing a plurality of smart folders.

Generally, a folder which carries documents prevents damage or contamination of the documents and maintains a clean state at all times although the folder stores the documents for a long time, and the folder provides a function that is convenient in carrying, as well as in storing, the documents.

Meanwhile, owing to advancement in hardware and software techniques related to computers, office environments and work efficiency have been improved remarkably. As a method of improving work efficiency by applying the techniques, a project of constructing a paperless environment has been steadily proceeded. However, although the paperless environment is very useful since information can be efficiently stored, processed, inquired and transferred, in order to construct the paperless environment, paper documents should be converted into digital contents that can be recognized by a computer since, until present, the documents cannot be created in a completely digital method using a computer.

Although converting a paper document into digital contents of a form combining text and images using a high level technique such as character recognition or the like is most desirable as a method of converting a paper document into digital contents, it is general that a paper document is converted into an image file using a scanner. Since such a conversion is a highly-repetitive and time-consuming work, it acts as an obstacle in the project of constructing a paperless environment. Such a work is still troublesome even now that high-speed and continuous scanners have been developed owing to advancement in technologies.

Accordingly, required is a smart folder which can digitally display paper documents so that the paper documents can be more efficiently viewed and stored as image files.

SUMMARY

Therefore, the present invention has been made in view of the above problems, and it is an object of the present invention to provide a smart folder which can display and copy digital contents. In addition, another object of the present invention is to provide a smart folder management system which can efficiently manage a plurality of smart folders.

To accomplish the above objects, according to one aspect of the present invention, there is provided a smart folder device for performing display and copy of digital contents, the device including: a screen folder having a folder structure including a cover front surface, a cover rear surface, a cover side surface for connecting the cover front surface and the cover rear surface, a cover first inner surface opposite to the cover front surface, a cover second inner surface opposite to the cover rear surface, and a pocket surface attached on the cover second inner surface, wherein digital contents are displayed on at least one among the cover front surface, the cover rear surface, the cover side surface for connecting the cover front surface and the cover rear surface, the cover first inner surface opposite to the cover front surface, the cover second inner surface opposite to the cover rear surface, and the pocket surface attached on the cover second inner surface; and a screen paper which is implemented in a form of a paper on which digital content are displayed, is inserted between the pocket surface and the cover second inner surface of the screen folder, wirelessly communicates with the screen folder, and transmits digital contents to the screen folder or receives digital contents from the screen folder and stores and displays the digital contents.

In addition, according to another aspect of the present invention, there is provided a smart folder management system including: a plurality of smart folders having a screen folder and a screen paper; a manager terminal for uploading digital contents stored in each smart folder, storing the digital contents by smart folder, classifying and displaying the digital contents by smart folder, title, date and creator; and a wireless communication network for establishing wireless communication between the smart folder and the manager terminal.

The manager terminal may be provided with search fields, search for digital contents matching a search keyword, and display smart folders in which searched digital contents are stored. User-registered fingerprints, registered in advance, may be stored in the smart folder, and the manager terminal may transmit and update the user-registered fingerprints by smart folder.

According to an embodiment of the present invention, since documents can be more efficiently managed as the documents can be copied and stored in a folder and a paper in association with each other in the form of digital contents, not in the form of paper documents. In addition, according to an embodiment of the present invention, security of a folder or a paper that is easy to carry can be improved.

DETAILED DESCRIPTION

Hereinafter, advantages and features of the present invention and a method of achieving the same will be more clearly understood from embodiments described below with reference to the accompanying drawings. However, the present invention is not limited to the following embodiments, but will be implemented in various different forms. The embodiments are provided merely to complete disclosure of the present invention and to fully provide a person having ordinary skill in the art to which the present invention pertains with the category of the invention. The present invention is defined only by the category of the claims. In addition, in describing the present invention, when it is determined that the detailed description of the known art related to the present invention may obscure the gist of the present invention, the detailed description thereof will be omitted.

Figure 1:
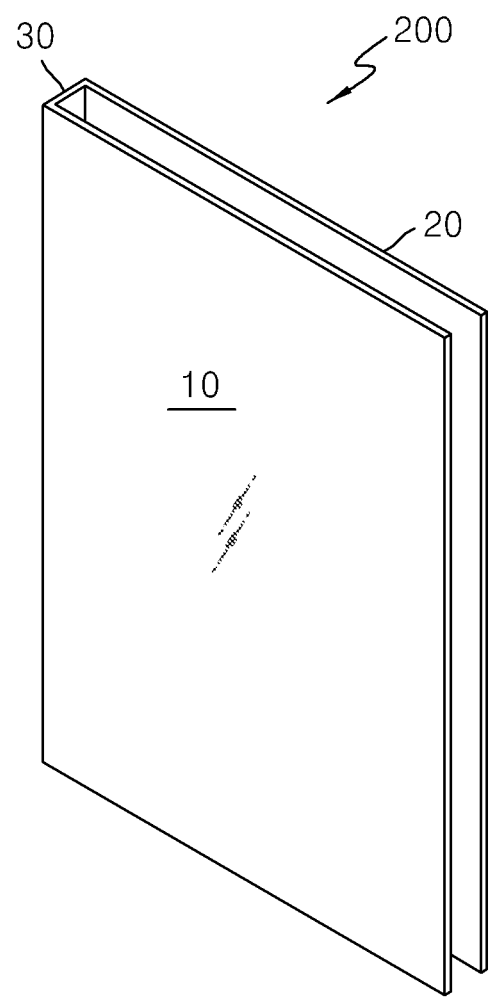
FIG. 1 shows a folded view of a screen folder device provided with a screen folder and a screen paper which perform display and copy of digital contents according to an embodiment of the present invention.
Figure 2:
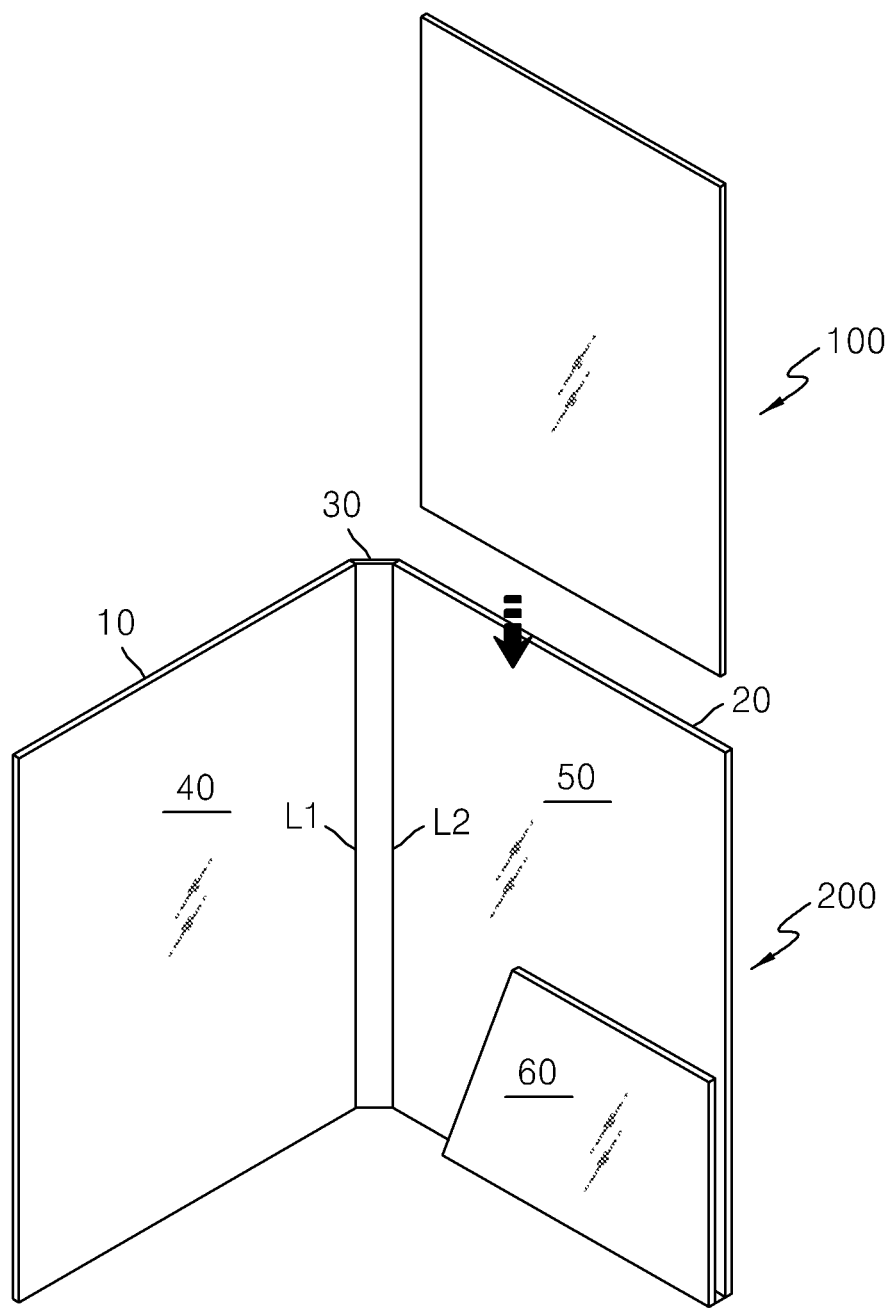
FIG. 2 shows an unfolded view of a screen folder without having a screen paper inserted therein according to an embodiment of the present invention.
Figure 3:
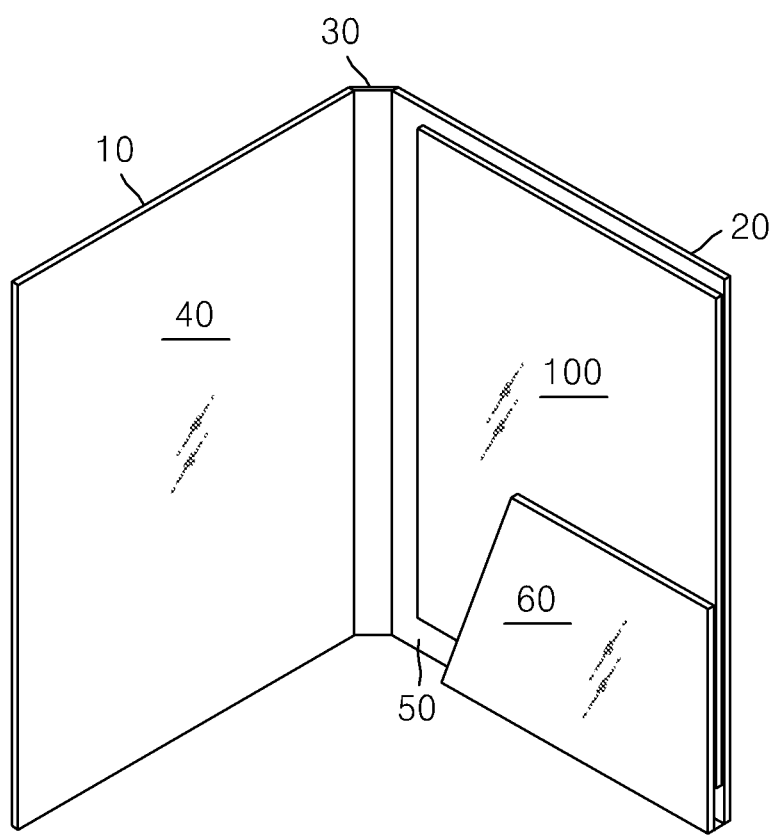
FIG. 3 shows an unfolded view of a screen folder having a screen paper inserted therein according to an embodiment of the present invention.
Figure 4:
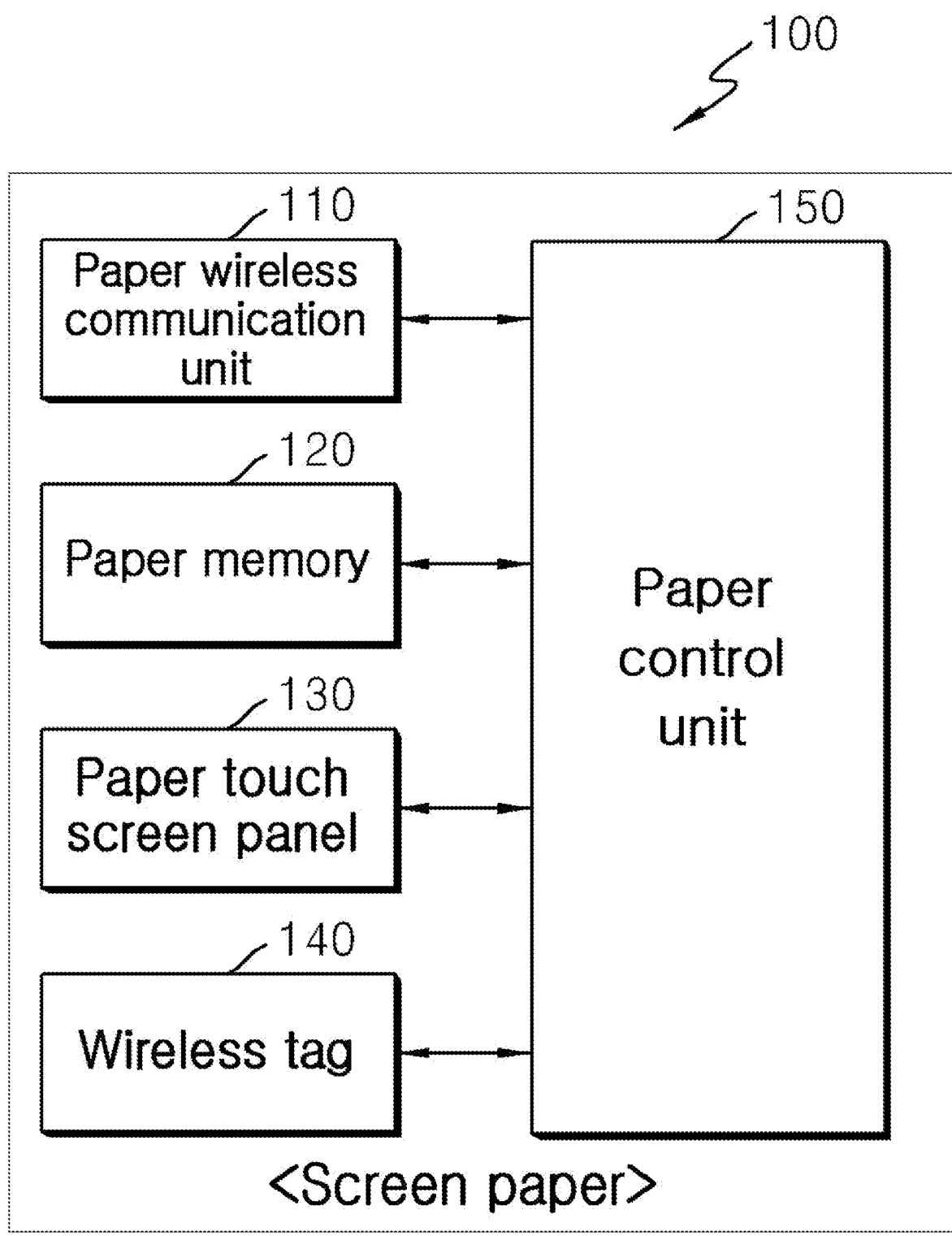
FIG. 4 is a block diagram showing the configuration of a screen paper according to an embodiment of the present invention.
Figure 5:
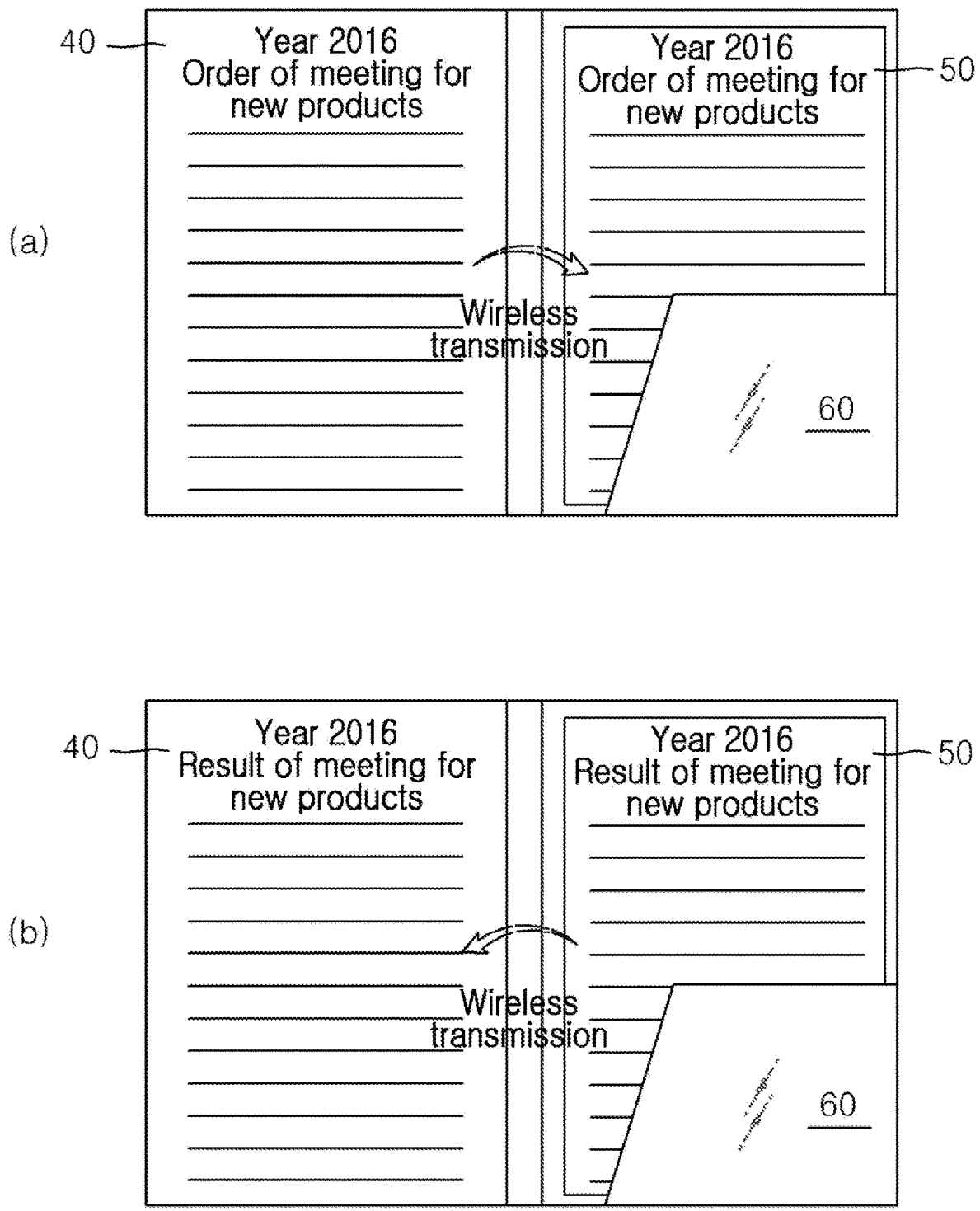
FIG. 5 shows a view of copying digital contents between a screen folder and a screen paper according to an embodiment of the present invention.

FIG. 1 shows a folded view of a screen folder device provided with a screen folder and a screen paper which perform display and copy of digital contents according to an embodiment of the present invention, FIG. 2 shows an unfolded view of a screen folder without having a screen paper inserted therein according to an embodiment of the present invention, FIG. 3 shows an unfolded view of a screen folder having a screen paper inserted therein according to an embodiment of the present invention, FIG. 4 is a block diagram showing the configuration of a screen paper according to an embodiment of the present invention, and FIG. 5 shows a view of copying digital contents between a screen folder and a screen paper according to an embodiment of the present invention.

A smart folder of the present invention is configured of a screen folder 200 and a screen paper 100 and may accomplish digitalization of documents as digital contents can be copied, stored and displayed through wireless communication between the screen folder 200 and the screen paper 100.

To this end, the screen folder 200 has a folder structure including a cover front surface 10, a cover rear surface 20, a cover side surface 30 connecting the cover front surface 10 and the cover rear surface 20, a cover first inner surface 40 opposite to the cover front surface 10, a cover second inner surface 50 opposite to the cover rear surface 20, and a pocket surface 60 attached on the cover second inner surface 50. Digital contents such as digital numbers, digital text, digital images and the like are displayed on each of the surfaces, and accordingly, the structure of a touch screen panel of a folder shape having the cover front surface 10, the cover rear surface 20, the cover side surface 30, the cover first inner surface 40, the cover second inner surface 50, and the pocket surface 60 on which the digital contents are displayed will be referred to as the screen folder 200 in the present invention.

The screen folder 200 has a folder structure that is bent and folded along a border line L1 between the cover front surface 10 and the cover side surface 30 and a border line L2 between the cover rear surface 20 and the cover side surface 30. Accordingly, the screen folder 200 has a folded structure as shown in FIG. 1 when the screen folder 200 is folded along the border line L1 between the cover front surface 10 and the cover side surface 30 and an unfolded structure as shown in FIG. 2 when the screen folder 200 is unfolded along the border line L1 between the cover front surface 10 and the cover side surface 30. In addition, it is not limited to the folding structure, but the cover front surface 10, the cover rear surface 20, the cover side surface 30, the cover first inner surface 40, and the cover second inner surface 50 may be implemented as a flexible substrate so that the screen folder 200 may have a bending structure, not a folding structure.

In addition, the pocket surface 60 provided on the cover second inner surface 50 is provided in a size equal to or smaller than the cover second inner surface 50 in a form attached on the cover second inner surface 50 so that the screen paper 100 may be inserted in the space between the cover second inner surface 50 and the pocket surface 60 as shown in FIG. 3. In addition, the pocket surface 60 may be provided in the form of an insertion slot on the cover second inner surface 50, not in the form attached on the cover second inner surface 50.

Meanwhile, at least one among the cover front surface 10, the cover rear surface 20, the cover side surface 30 connecting the cover front surface 10 and the cover rear surface 20, the cover first inner surface 40 opposite to the cover front surface 10, the cover second inner surface 50 opposite to the cover rear surface 20, and the pocket surface 60 is implemented as a display panel on which digital contents are displayed. Accordingly, the digital contents may be displayed on any one or more surfaces of the cover front surface 10, the cover rear surface 20, the cover side surface 30, the cover first inner surface 40, the cover second inner surface 50, and the pocket surface 60.

Accordingly, a digital contents title, a user authentication means, and user handling buttons may be digitally displayed on the cover front surface 10, and a folder name of the screen folder 200 may be digitally displayed on the cover side surface 30, and details of stored digital contents may be digitally displayed on the cover first inner surface 40, and the stored digital contents may be displayed on the pocket surface 60 in the form of thumbnails. In some cases, a work progress of copying or storing the digital contents may be displayed on the cover side surface 30 in the form of a bar graph. The screen folder 200 like this will be described below in detail with reference to the block diagram shown in FIG. 6.

Meanwhile, the screen paper 100 is implemented in the form of a paper on which digital contents are displayed. Accordingly, hereinafter, the screen paper 100 refers to a touch screen panel of a thin paper form on which digital contents such as digital numbers, digital text, digital images and the like are displayed. Accordingly, a user may input digital contents using a keyboard or register images through the screen paper 100 and may display and correct the inputted digital contents on the screen paper 100.

The screen paper 100 may be provided in plurality, and a plurality of screen papers 100 may be placed between the pocket surface 60 and the cover second inner surface 50 of the screen folder 200. When the screen paper 100 is inserted between the pocket surface 60 and the cover second inner surface 50 of the screen folder 200 as shown in FIG. 3, the screen paper 100 performs wireless exchange of digital contents with the screen folder 200. That is, digital contents stored in the screen paper 100 are transmitted to the screen folder 200, or the screen paper 100 receives, stores and displays digital contents from the screen folder 200. To this end, the screen paper 100 wirelessly communicates with the screen folder 200.

Referring to FIG. 4, the screen paper 100 may include a paper wireless communication unit 110, a paper memory 120, a paper touch screen panel 130, a wireless tag 140, and a paper control unit 150.

The paper wireless communication unit 110 performs short distance wireless communication with the screen folder 200. The short distance wireless communication may establish various short distance wireless communications such as infrared radiation communication, Bluetooth communication, home radio frequency (RF) communication, and the like.

The paper memory 120 is a memory for storing digital contents. The paper memory 120 may be provided in a form embedded in the screen paper 100 or in a form installed outside the screen paper 100. Like this, the paper memory 120 is a module which can input and output information, such as a hard disk drive, a solid state drive (SSD), a flash memory, a compact flash (CF) card, a secure digital (SD) card, a smart media (SM) card, a multi-media card (MMC), a memory stick or the like, and may be provided in the device or in a separate device.

The paper touch screen panel 130 is provided on the screen paper 100 to display digital contents and receive input of user's handling. For reference, the touch screen panel is a display window which provides a touch screen capable of simultaneously performing input and display and displays various graphic user interfaces (GUI).

The wireless tag 140 is a tag on which a unique identification number of the screen paper 100 is recorded. For example, a first wireless tag 140 on which a unique first identification number of a digital first paper is recorded may be attached on the digital first paper, and a second wireless tag 140 on which a unique second identification number of a digital second paper is recorded may be attached on the digital second paper. Various kinds of tags capable of performing wireless communication, such as an NFC tag, an RF chip and the like, may be used as the wireless tag 140.

The paper control unit 150 stores digital contents inputted through the paper touch screen panel 130 in the paper memory 120. In addition, the paper control unit 150 receives digital contents wirelessly transmitted from the smart folder and stores the digital contents in the paper memory 120 or displays the digital contents as shown in FIG. 5(a), and wirelessly transmits digital contents stored in the paper memory 120 of the screen paper 100 or digital contents displayed on the paper touch screen panel to the smart folder as shown in FIG. 5(b).

Figure 6:
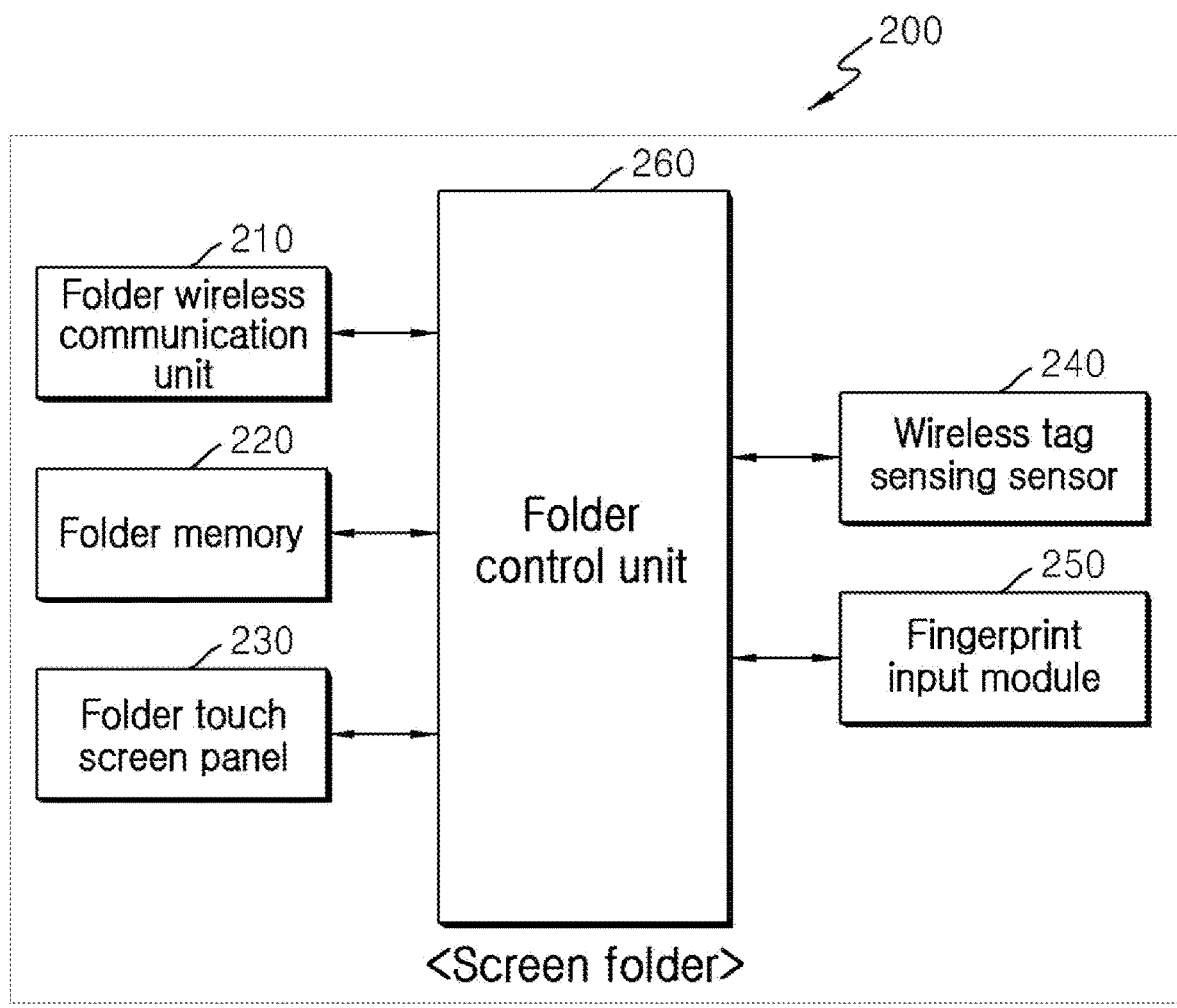
FIG. 6 is a block diagram showing the configuration of a screen folder according to an embodiment of the present invention.
Figure 7:
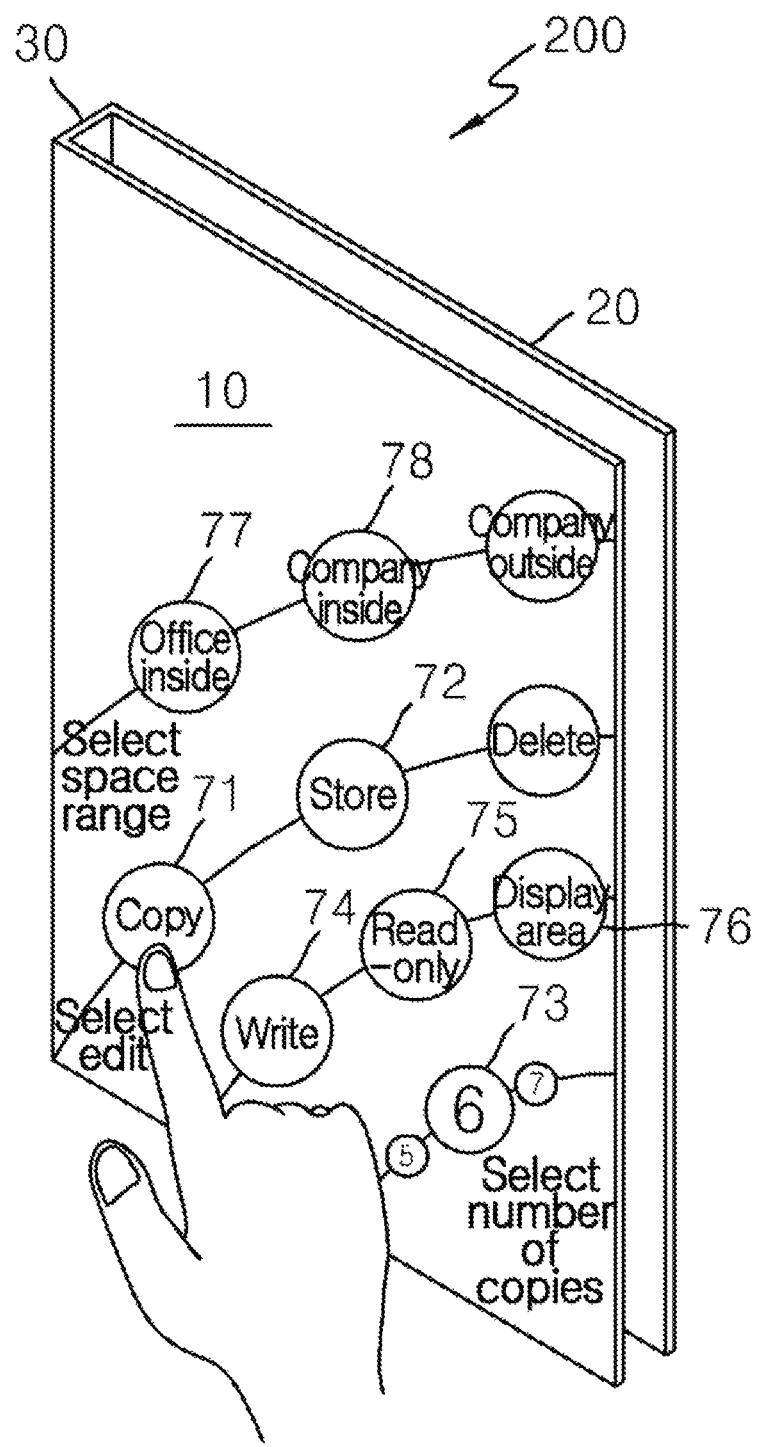
FIG. 7 is a view showing user handling buttons displayed on the cover front surface of a screen folder according to an embodiment of the present invention.
Figure 8:
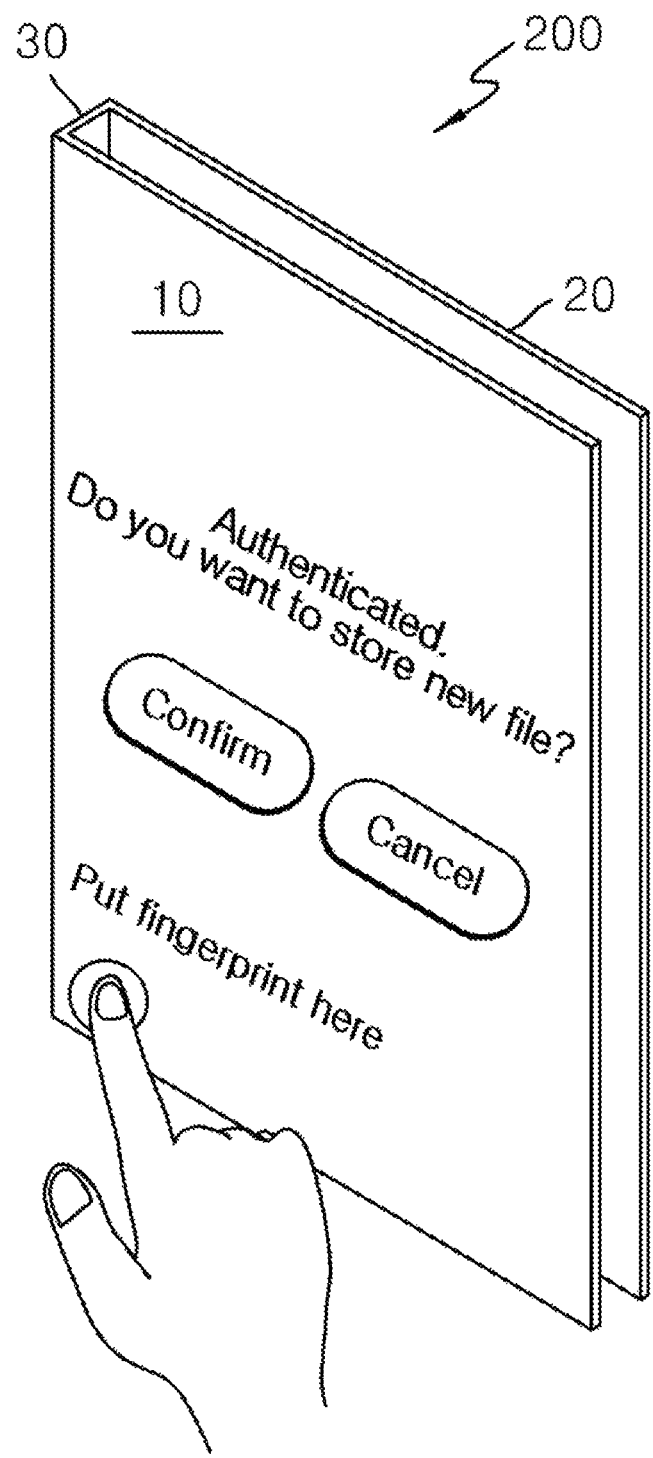
FIG. 8 shows a view of going through security authentication according to an embodiment of the present invention.
Figure 9:
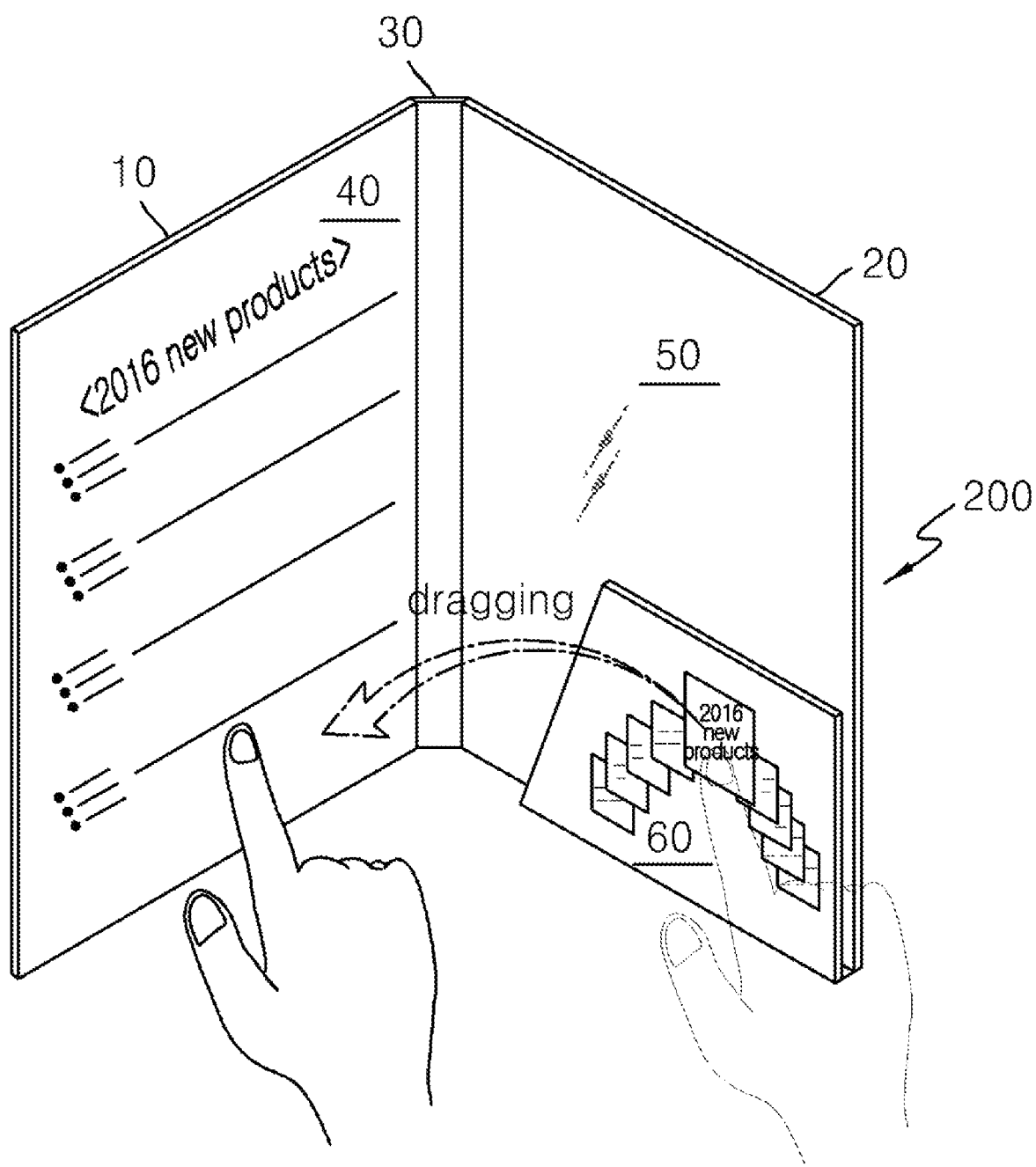
FIG. 9 shows a view of enlarging a thumbnail displayed on the pocket surface and displaying the enlarged thumbnail on the cover front surface by dragging according to an embodiment of the present invention.
Figure 10:
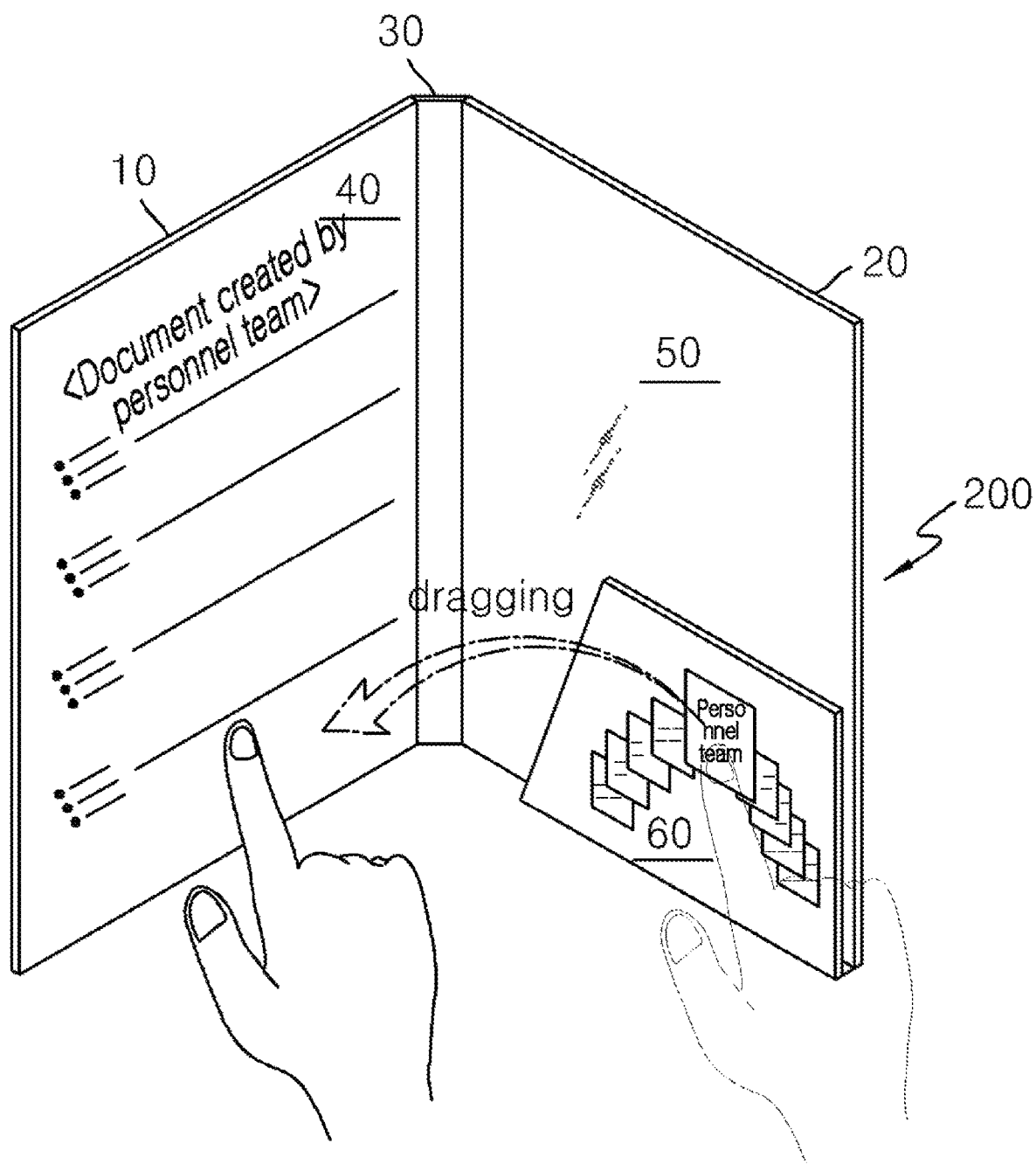
FIG. 10 shows a view of displaying a table of contents of digital contents assigned to a thumbnail, which is displayed on the pocket surface, on the cover front surface according to an embodiment of the present invention.
Figure 11:
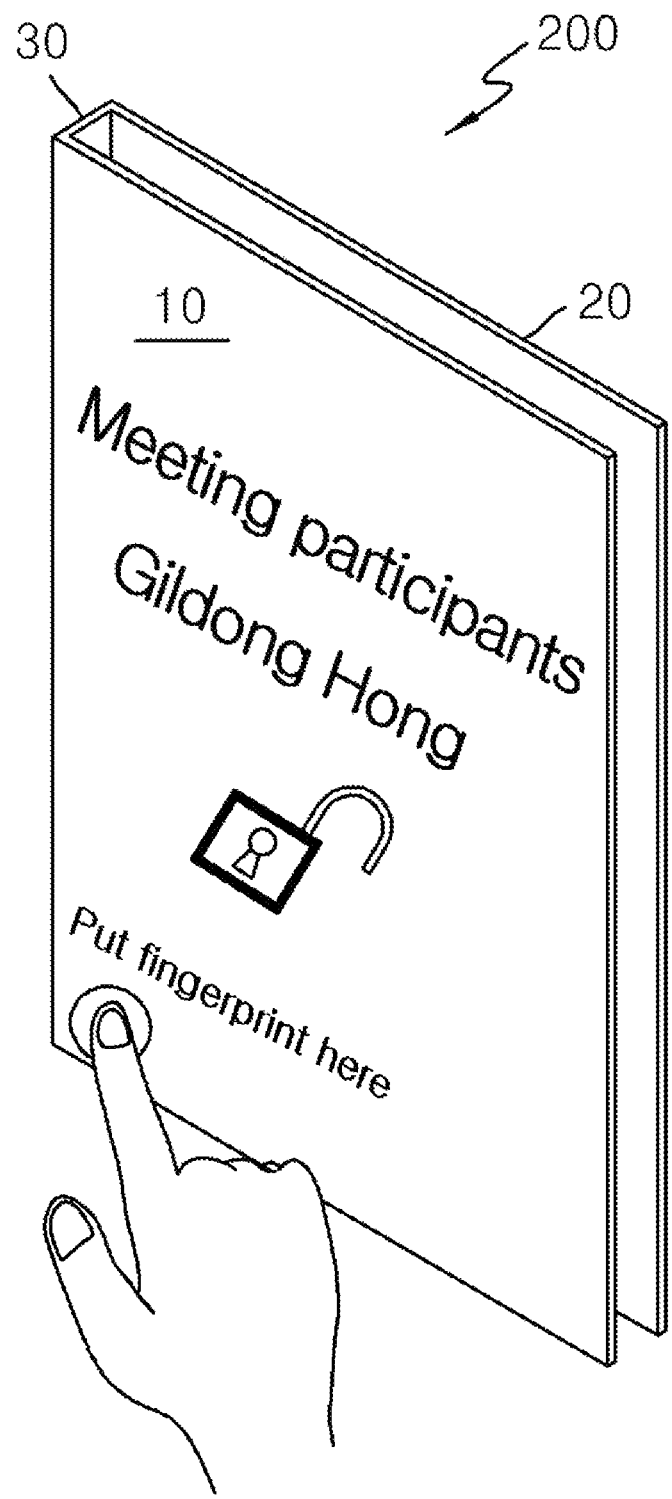
FIG. 11 shows a view of performing fingerprint authentication according to an embodiment of the present invention.

FIG. 6 is a block diagram showing the configuration of a screen folder according to an embodiment of the present invention, FIG. 7 is a view showing user handling buttons displayed on the cover front surface of a screen folder according to an embodiment of the present invention, FIG. 8 shows a view of going through security authentication according to an embodiment of the present invention, FIG. 9 shows a view of enlarging a thumbnail displayed on the pocket surface and displaying the enlarged thumbnail on the cover front surface by dragging according to an embodiment of the present invention, and FIG. 10 shows a view of displaying a table of contents of digital contents assigned to a thumbnail, which is displayed on the pocket surface, on the cover front surface according to an embodiment of the present invention, and FIG. 11 shows a view of performing fingerprint authentication according to an embodiment of the present invention.

As shown in FIG. 6, the screen folder 200 may further include a folder wireless communication unit 210, a folder memory 220, a folder touch screen panel 230, a wireless tag sensing sensor 240, and a folder control unit 260. In addition, the screen folder 200 may further include a fingerprint input module 250.

The folder wireless communication unit 210 is a module for performing short distance wireless communication with the screen paper 100, and the short distance wireless communication may establish various short distance wireless communications such as infrared radiation communication, Bluetooth communication, home radio frequency (RF) communication and the like.

The folder memory 220 is a memory for storing digital contents such as digital text, digital numbers, digital images and the like. The folder memory 220 may be provided in a form embedded in the cover front surface 10, the cover rear surface 20, the cover side surface 30, the cover first inner surface 40, the cover second inner surface 50, and the pocket surface 60 or in a form installed outside the screen folder 200.

The folder touch screen panel 230 is a touch screen panel provided on each of the cover front surface 10, the cover rear surface 20, the cover side surface 30, the cover first inner surface 40, the cover second inner surface 50, and the pocket surface 60. Accordingly, the folder touch screen panel 230 may include a cover front surface touch screen panel provided on the cover front surface 10, a cover rear surface touch screen panel provided on the cover rear surface 20, a cover side surface touch screen panel provided on the cover side surface 30, a cover first inner surface touch screen panel provided on the cover first inner surface 40, a cover second inner surface touch screen panel provided on the cover second inner surface 50, and a pocket surface touch screen panel provided on the pocket surface 60. Furthermore, although the cover front surface touch screen panel, the cover rear surface touch screen panel and the cover side surface touch screen panel may be implemented as separate touch screen panels, the cover front surface touch screen panel, the cover rear surface touch screen panel and the cover side surface touch screen panel may be provided as a flexible touch screen panel to be implemented as a touch screen panel of a folding structure.

The wireless tag sensing sensor 240 is located on the cover second inner surface 50 and may sense the screen paper 100 inserted in the space between the cover second inner surface 50 and the pocket surface 60. The wireless tag sensing sensor 240 is an RF antenna for sensing an identification number of the wireless tag 140 of the screen paper 100 inserted in the space between the cover second inner surface 50 and the pocket surface 60, and accordingly, the wireless tag sensing sensor 240 may sense the identification number of the inserted screen paper 100. If the identification number is sensed, it is determined that a screen paper is inserted between the cover second inner surface 50 and the pocket surface 60.

The folder control unit 260 displays digital contents stored in the folder memory 220 on the cover first inner surface 40. Then, if a preset user's transmission handling is sensed while the wireless tag 140 of the screen paper 100 inserted in the pocket surface 60 is sensed, a copy function of transmitting the digital contents stored in the folder memory 220 to the screen paper 100 is performed as shown in FIG. 5(a). In addition, if a preset user's reception handling is sensed while the wireless tag 140 of the screen paper 100 inserted in the pocket surface 60 is sensed, a storing function of receiving the digital contents wirelessly transmitted from the screen paper 100 and storing the digital contents in the folder memory 220 is performed as shown in FIG. 5(b). Like this, the screen folder 200 and the screen paper 100 may wirelessly exchange digital contents stored therein with each other.

Meanwhile, one or more user handling buttons may be displayed on the folder touch screen panel 230 provided on the cover front surface 10 of the screen folder 200. The folder control unit 260 performs a copy function of transmitting digital contents stored in the folder memory 220 to the screen paper 100 in response to handling of the user on the user handling buttons, and if a preset user's reception handling is sensed, the folder control unit 260 performs a function of receiving digital contents wirelessly transmitted from the screen paper 100 and storing the digital contents in the folder memory 220.

To this end, the user handling buttons may include a copy button 71 for receiving a request for a copy function, a storage button 72 for receiving a request for a storage function, and a number-of-copy setting button 73 for setting the number of copies for performing the copy function as shown in FIG. 7.

Accordingly, when the copy button 71 is selected by the user, the folder control unit 260 transmits selected digital contents and a copy control command for storing/displaying the digital contents to the screen paper 100. That is, after displaying the digital contents stored in the folder memory 220 on the folder touch screen panel 230, the folder control unit 260 transmits selected digital contents to the screen paper 100 through short distance wireless communication if the copy button 71 is inputted after any one or more of digital contents is selected by the user. In addition, the folder control unit 260 transmits a copy control command, requesting storage of the transmitted digital contents in the paper memory 120 of the screen paper 100 and display of the digital contents on the paper touch screen panel 130, to the screen paper 100.

In addition, when the storage button 72 is selected by the user, the folder control unit 260 transmits a storage control command, requesting transmission of the digital contents displayed on the screen paper 100 to the screen folder 200, to the screen paper 100. That is, when the storage button 72 is selected by the user, the folder control unit 260 transmits a storage control command, requesting transmission of the digital contents currently displayed on the screen paper 100 to the screen folder 200, to the screen paper 100, and stores digital contents received from the screen paper 100 in the folder memory 220 provided in the screen folder 200.

In addition, when the number of copies is selected by the user through the number-of-copy setting button 73, the folder control unit 260 transmits the copy control command only to as many screen papers 100 as a number matching the number of copies set through the number-of-copy setting button 73. For example, if it is assumed that a first screen paper 100 having an identification number of 0x1, a second screen paper 100 having an identification number of 0x2, a third screen paper 100 having an identification number of 0x3, a fourth screen paper 100 having an identification number of 0x4, a fifth screen paper 100 having an identification number of 0x5, and a sixth screen paper 100 having an identification number of 0x6 are placed in the space between the pocket surface 60 and the inner side of the screen folder 200, and when 'all papers' is selected as the number of copies through the number-of-copy setting button 73, the folder control unit 260 transmits the copy control command to all of the first to sixth screen papers 100. Contrarily, when 'three papers' is selected as the number of copies through the number-of-copy setting button 73, the folder control unit 260 transmits the copy control command only to the first to third screen papers 100 to perform the copy function only on the first to third screen papers 100.

Meanwhile, the user handling buttons may further include a display area setting button 76, a read button 75 and a write button 74.

The display area setting button 76 is a button for setting a display area of the screen paper 100, which is an area for displaying digital contents on the screen paper 100. Accordingly, the folder control unit 260 may transmit a display control command, requesting display of the digital contents in the display area of the screen paper 100 set through the display area setting button 76, to the screen paper 100. For example, when an 'upper area' is set through the display area setting button 76, the folder control unit 260 transmits a display control command for displaying the digital contents in an upper area of the screen paper 100, and when a 'center area' is set through the display area setting button 76, the folder control unit 260 transmits a display control command for displaying the digital contents in the center area of the screen paper 100.

In addition, the read button 75 receives selection of read-only mode of the screen paper 100. When the read button 75 is selected by the user, the folder control unit 260 transmits a read-only control command, which does not allow edit of a document or creation of a new document and allows only display of documents through the screen paper 100, to the screen paper 100. Accordingly, the paper control unit of the screen paper 100 receiving the read-only control command only displays digital contents on the screen paper 100 and does not allow input or edit of the digital contents.

In addition, the write button 74 is a button for receiving selection of writable mode of the screen paper 100. When the write button 74 is selected by the user, the folder control unit 260 transmits a writable control command to the screen paper 100 so that read, edit and creation of documents are allowed through the screen paper 100. Accordingly, the paper control unit 150 of the screen paper 100 receiving the writable control command may receive new digital contents from the user through the screen paper 100 or have the user edit the displayed digital contents.

Meanwhile, the digital contents stored in the screen folder 200 may be confidential document content. Accordingly, a separate authentication means is further provided so that the confidential document content may not be illegally leaked to an unauthorized third party.

To this end, the screen folder 200 may further include a fingerprint input module 250 provided on the cover front surface 10 to receive a fingerprint of the user. In addition, user-registered fingerprints, registered in advance, are stored in the folder memory 220. For example, when the screen paper 100 is inserted in the pocket surface 60 of the screen folder 200 and the screen folder 200 is folded, a right lower portion of the cover front surface 10 of the screen folder 200 blinks, and if a fingerprint is recognized through the blinking portion, a sentence 'Will you store the file?' is displayed as shown in FIG. 8, and if 'Confirm' is clicked to store the file, the digital contents of the screen paper 100 are stored in the screen folder 200.

Accordingly, the control unit receives handling of the user handling buttons only when the fingerprint inputted through the fingerprint input module 250 matches the user-registered fingerprint. If the fingerprint inputted through the fingerprint input module 250 does not match the user-registered fingerprint, handling input of the user handling buttons is not allowed, and thus security can be enhanced since the digital contents stored in the screen folder 200 or the screen paper 100 cannot be displayed, copied or stored.

Meanwhile, the smart folder may include a folding sensing sensor for sensing folding of the screen folder when the screen folder 200 is bent along the border line between the cover front surface 10 and the cover side surface 30. The folding sensing sensor measures a curvature, which is a degree of bending the border line between the cover front surface 10 and the cover side surface 30 implemented as a flexible substrate. The folding sensing sensor may be implemented as a variety of sensors such as a piezo electric film sensor of a film shape and the like, and may be implemented as a sensor which electrically converts physical movements. For example, the folding sensing sensor may be located on the rear surface, and since the folding sensing sensor outputs an electrical resistance value of about 10 [KΩ] in a flat state and outputs an electrical resistance value of 15 to 30 [KΩ] in a state of bending 90 degrees or more, the curvature, which is a degree of bending, may be measured.

Accordingly, when unfolding over a preset angle is sensed while the screen folder is folded along the border line between the cover front surface 10 and the cover side surface 30, the folder control unit 260 may display the digital contents stored in the folder memory 220 on the pocket surface 60 in the form of a thumbnail icon as shown in FIG. 9.

The thumbnail icon like this may have various shapes and may be shaped in a reduced icon reducing each of the digital contents. A thumbnail icon desired by the user may be selected while moving a plurality of thumbnail icons by dragging.

When a thumbnail icon selected by the user is dragged to the cover first inner surface 40 by the user, the folder control unit 260 may enlarge the digital contents assigned to the selected thumbnail icon and display the enlarged digital contents on the cover first inner surface 40. Accordingly, the user may view the digital contents in detail through the cover first inner surface 40.

For reference, when a thumbnail icon selected by the user is dragged to the cover first inner surface 40 by the user, the paper control unit 150 of the screen paper 100 may provide the screen folder 200 with coordinate information of the dragging or information on the dragging informing that the thumbnail icon is dragged to the left side so that the folder control unit 260 of the screen folder 200 may know that the thumbnail icon is dragged.

Meanwhile, the thumbnail icon is displayed on the pocket surface 60 in plurality, and each thumbnail icon may be assigned by field of the digital contents stored in the folder memory 220. Accordingly, when a thumbnail icon selected by the user is dragged to the cover first inner surface 40 by the user, a table of contents of the digital contents assigned to the selected thumbnail icon may be displayed on the cover first inner surface 40. For example, when the thumbnail icons displayed on the pocket surface 60 are classified into 'personnel team', 'planning team', 'development team' and 'production team' as shown in FIG. 10, if the thumbnail icon of the 'personnel team' is selected and dragged, a list of digital contents of the documents created by the 'personnel team' is displayed on the cover first inner surface 40.

Meanwhile, since the screen paper 100 and the screen folder 200 may be separately carried, they are vulnerable to security. When confidential content of a company is stored in the screen paper 100 or the screen folder 200, there will be a security vulnerability.

Accordingly, three security enhancement means described below are provided to enhance the security vulnerability of the screen paper 100.

For the first method of enhancing the security, the folder control unit 260 of the present invention transmits a data lock command or a data deletion command to the screen paper 100 when strength of the RF signal of the wireless tag 140 provided on the screen paper 100 falls below a preset reference value. For example, when the wireless tag 140 is implemented as an RF chip, the RF chip is activated by a sensing signal of an RF chip sensing sensor and transmits an RF signal, and a wireless tag sensing sensor of the screen folder 200 receives the RF signal, and if the strength of the received RF signal falls below a reference value, the folder control unit 260 of the screen folder 200 determines that the screen paper 100 is spaced apart from the screen folder 200 more than a preset distance (e.g., two meters or more) and transmits a data lock command or a data deletion command to the screen paper 100.

Accordingly, the paper control unit 150 of the screen paper 100 receiving the data lock command inhibits display and change of the digital contents stored in the paper memory 120 of the screen paper 100, and in addition, the paper control unit 150 of the screen paper 100 receiving the data deletion command deletes the digital contents stored in the paper memory 120 of the screen paper 100.

As a result, if the screen paper 100 is spaced apart from the screen folder 200 more than a preset distance (e.g., two meters or more), the RF signal of the wireless tag 140 provided in the screen paper 100 falls below a preset reference value, and at this point, the folder control unit 260 may prevent leakage of data stored in the screen paper 100 to the outside by transmitting a data lock command or a data deletion command to the screen paper 100. Accordingly, although an unauthorized third party steals only the screen paper 100 from a meeting room and runs away, leakage of digital contents to the outside can be prevented through locking/deletion of the digital contents in the screen paper 100.

In addition, for the second method of enhancing the security, when the wireless tag sensing sensor 240 of the smart folder device of the present invention senses an entrance door wireless tag (not shown) installed at the entrance door, the folder control unit 260 performs a lock control of inhibiting display of the digital contents stored in the folder memory 220 of the screen folder 200 or a deletion control of deleting the digital contents and transmits a data lock command or a data deletion command to the screen paper 100. Accordingly, when an unauthorized third party steals the screen folder 200 or the screen paper 100 and goes out of the meeting room, leakage of digital contents to the outside can be prevented through locking/deletion of the digital contents stored in the screen paper 100.

To this end, security area setting buttons 77 and 78 may be provided on the cover front surface 10 as shown in FIG.

7. When an office's internal security area button 77 is selected, the folder control unit 260 determines whether a wireless tag installed at the entrance door of the office is sensed and performs a lock control or a deletion control. In the same way, when a company's internal security area button 78 is selected, the folder control unit 260 determines whether a wireless tag installed at the entrance door of the company is sensed and performs a lock control or a deletion control.

In addition, for the third method of enhancing the security, the folder control unit 260 of the present invention allows display, edit and writing of digital contents on the screen folder 200 or on the screen paper 100 only when a fingerprint inputted through the fingerprint input module 250 matches a user-registered fingerprint, and controls to operate in a locking mode when the fingerprint inputted through the fingerprint input module 250 does not match the user-registered fingerprint.

For example, a meeting host may give a smart folder 200 containing a screen paper 100 to employees entering a meeting room, and in this case, as shown in FIG. 11, employees receiving the smart folder are authenticated using a fingerprint, and only the employees registered in the list of participants of the meeting are released from the lock setting and allowed to view digital contents.

Meanwhile, the smart folder device configured of the screen folder 200 and the screen paper 100 of the present invention may be provided in plurality, and it is efficient for the management to provide a network management means that can search for and manage digital contents stored in each smart folder. Hereinafter, this will be described in detail with reference to FIG. 12.

Figure 12:
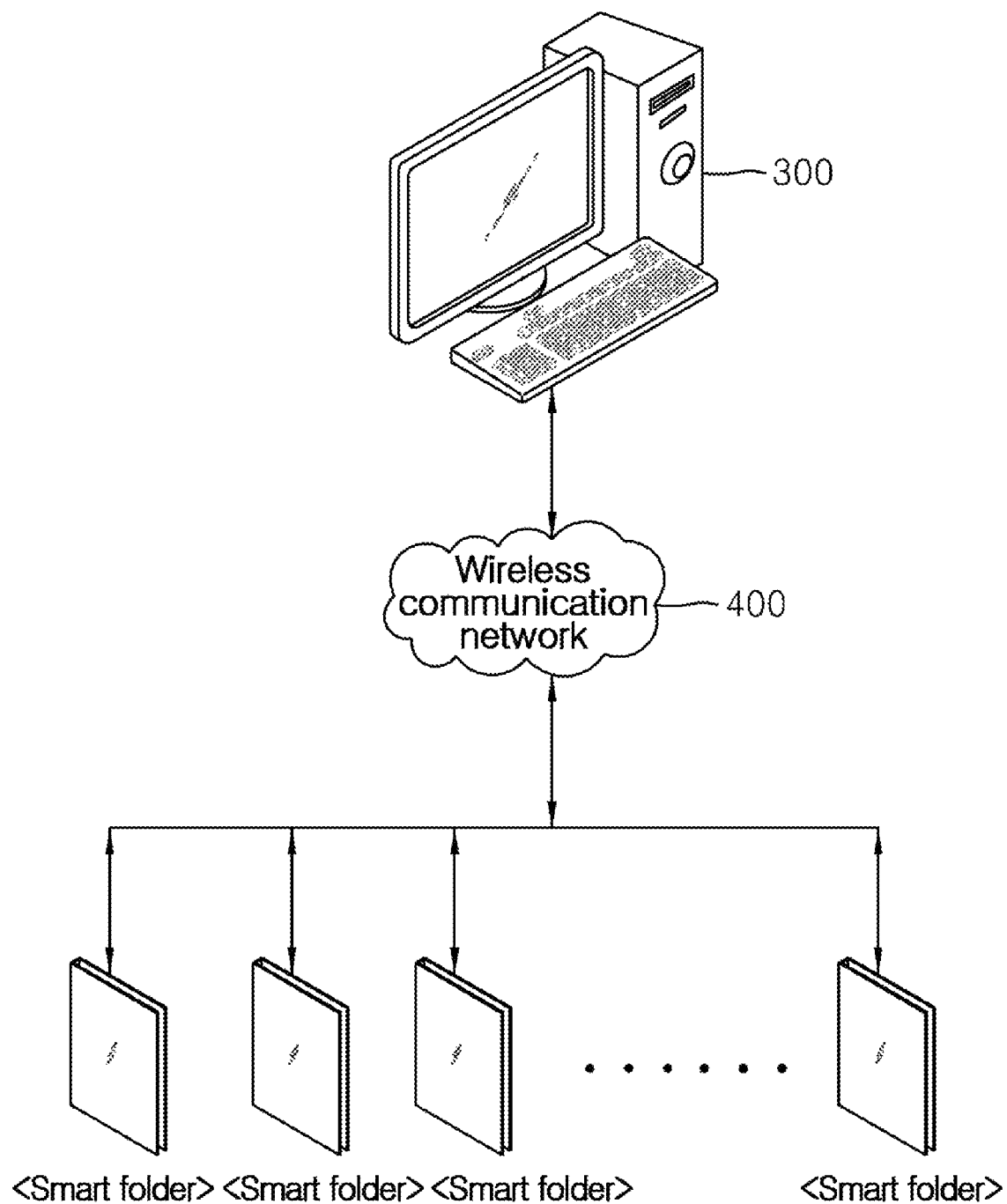
FIG. 12 is a view showing the configuration of a smart folder management system for managing a plurality of smart folders according to an embodiment of the present invention.

FIG. 12 is a view showing the configuration of a smart folder management system for managing a plurality of smart folders according to an embodiment of the present invention.

A smart folder management system may include a wireless communication network 400, a plurality of smart folders, and a manager terminal 300.

The wireless communication network 400 establishes wireless communication between the smart folder and the manager terminal 300. Various wireless communication methods such as Bluetooth, home radio frequency (RF), and wireless LAN may be used as the wireless communication.

The smart folder is a folder configured of the screen folder 200 and the screen paper 100 described above. That is, the smart folder is configured of: the screen folder 200 having a folder structure including a cover front surface 10, a cover rear surface 20, a cover side surface 30 connecting the cover front surface 10 and the cover rear surface 20, a cover first inner surface 40 opposite to the cover front surface 10, a cover second inner surface 50 opposite to the cover rear surface 20, and a pocket surface 60 attached on the cover second inner surface 50, wherein digital contents are displayed on at east one among the cover front surface 10, the cover rear surface 20, the cover side surface 30 connecting the cover front surface 10 and the cover rear surface 20, the cover first inner surface 40 opposite to the cover front surface 10, the cover second inner surface 50 opposite to the cover rear surface 20, and the pocket surface 60 attached on the cover second inner surface 50; and the screen paper 100 implemented in the form of a paper on which the digital contents are displayed, to perform wireless exchange of the digital contents with the screen folder 200 when the screen paper 100 is inserted between the pocket surface 60 and the cover second inner surface 50 of the screen folder 200. The screen folder 200 like this is provided in plurality and managed by the manager terminal 300.

The manager terminal 300 is configured of a desktop PC, a notebook PC, a smart phone or the like, uploads digital contents stored in each smart folder, and stores the digital contents by smart folder. In addition, the manager terminal 300 classifies and displays the digital contents by smart folder, title, date and creator.

In addition, the manager terminal 300 may be provided with search fields, search for digital contents matching a search keyword, and display smart folders in which searched digital contents are stored. Accordingly, it is easy to search and find smart folders in which desired digital contents are stored.

User-registered fingerprints, registered in advance, are stored in the folder memory 220 of the smart folder, and the manager terminal 300 may transmit and update the user-registered fingerprints by smart folder. For example, first, third, seventh and eighth user-registered fingerprints may be transmitted to a first smart folder to be stored therein, and second, third, fifth and ninth user-registered fingerprints may be transmitted to a second smart folder to be stored therein. Accordingly, only first, third, seventh and eighth users may use the first smart folder, and the other users may not use the first smart folder since the first smart folder is set to a locking mode when the other users attempt to use the first smart folder. In the same way, only second, third, fifth and ninth users may use the second smart folder, and the other users may not use the second smart folder since the second smart folder is set to a locking mode when the other users attempt to use the second smart folder.

The embodiments in the description of the present invention are most preferable example selected among various examples that can be embodied and presented for better understanding of those skilled in the art, and the spirit of the present invention is not necessarily limited or restricted by these embodiments, but various modifications, changes and equivalent other embodiments can be made without departing from the spirit of the present invention.

The invention claimed is:

1. A smart folder device for performing display and copy of digital contents, the device comprising:
    a screen folder having a folder structure including a cover front surface, a cover rear surface, a cover side surface for connecting the cover front surface and the cover rear surface, a cover first inner surface opposite to the cover front surface, a cover second inner surface opposite to the cover rear surface, and a pocket surface attached on the cover second inner surface, wherein digital contents are displayed on at least one among the cover front surface, the cover rear surface, the cover side surface for connecting the cover front surface and the cover rear surface, the cover first inner surface opposite to the cover front surface, the cover second inner surface opposite to the cover rear surface, and the pocket surface attached on the cover second inner surface; and
    a screen paper which is implemented in a form of a paper on which digital content are displayed, is inserted between the pocket surface and the cover second inner surface of the screen folder, wirelessly communicates with the screen folder, and transmits digital contents to the screen folder or receives digital contents from the screen folder and stores and displays the digital contents, wherein the screen folder includes:
 a folder wireless communication unit for wirelessly communicating with the screen paper;
 a folder memory for storing digital contents;
 folder touch screen panels provided on each of the cover front surface, the cover rear surface, the cover side surface, the cover first inner surface, the cover second inner surface, and the pocket surface;
 a wireless tag sensing sensor located on the cover second inner surface to sense an identification number of a wireless tag of a screen paper inserted in a space between the cover second inner surface and the pocket surface; and
 a folder control unit for displaying the digital contents stored in the folder memory on the cover first inner surface, and, while a wireless tag of the screen paper inserted in the pocket surface is sensed, performing a copy function of transmitting the digital contents stored in the folder memory to the screen paper if a preset user's transmission handling is sensed, and performing a storing function of receiving digital contents wirelessly transmitted from the screen paper and storing the digital contents in the folder memory if a preset user's reception handling is sensed.

2. The device according to claim 1, wherein one or more user handling buttons are displayed on the folder touch screen panel provided on the cover front surface, and the folder control unit performs a copy function or a storage function according to input of the user handling buttons.

3. The device according to claim 2, wherein the user handling buttons include:
 a copy button for receiving a request for the copy function;
 a storage button for receiving a request for the storage function; and
 a number-of-copy setting button for setting the number of copies for performing the copy function, wherein
 the folder control unit transmits selected digital contents and a copy control command for storing/displaying a transmitted the digital contents to the screen paper when the copy button is selected by a user, transmits a storage control command, requesting transmission of the digital contents displayed on the screen paper to the screen folder, to the screen paper when the storage button is selected by the user, and transmits the copy control command only to as many screen papers as a number matching the number of copies set through the number-of-copy setting button when the number of copies is selected by the user through the number-of-copy setting button.

4. The device according to claim 3, wherein the user handling buttons include a display area setting button for setting a display area of the screen paper, which is an area for displaying digital contents on the screen paper, wherein the folder control unit transmits a display control command, requesting display of digital contents in the display area of the screen paper set through the display area setting button, to the screen paper.

5. The device according to claim 4, wherein the user handling buttons include:
 a read button for receiving selection of read-only mode of the screen paper; and
 a write button for receiving selection of writable mode of the screen paper, wherein
 the folder control unit transmits a read-only control command, which does not allow edit of a document or creation of a new document and allows only display of documents through the screen paper, to the screen paper when the read button is selected by the user and transmits a writable control command to the screen paper when the write button is selected by the user so that read, edit and creation of documents are allowed through the screen paper.

6. The device according to claim 5, wherein the screen folder includes a fingerprint input module provided on the cover front surface to receive a fingerprint of the user, wherein user-registered fingerprints, registered in advance, are stored in the folder memory, and the control unit receives handling of the user handling buttons only when a fingerprint inputted through the fingerprint input module matches a user-registered fingerprint.

7. The device according to claim 1, wherein the screen folder includes a folding sensing sensor for sensing folding of the screen folder when the screen folder is bent along a border line between the cover front surface and the cover side surface, wherein when unfolding over a preset angle is sensed while the screen folder is folded along the border line between the cover front surface and the cover side surface, the folder control unit displays the digital contents stored in the folder memory on the pocket surface in a form of a thumbnail icon.

8. The device according to claim 7, wherein when a thumbnail icon selected by the user is dragged to the cover first inner surface by the user, the folder control unit enlarges digital contents assigned to the selected thumbnail icon and display the enlarged digital contents on the cover first inner surface.

9. The device according to claim 7, wherein the thumbnail icon is displayed on the pocket surface in plurality, and each thumbnail icon is assigned by field of the digital contents stored in the folder memory, and when a thumbnail icon selected by the user is dragged to the cover first inner surface by the user, a table of contents of the digital contents assigned to the selected thumbnail icon is displayed on the cover first inner surface.

10. A smart folder management system comprising:
 a plurality of smart folders implemented in claim 1 and having a screen folder and a screen paper;
 a manager terminal for uploading digital contents stored in each smart folder, storing the digital contents by smart folder, classifying and displaying the digital contents by smart folder, title, date and creator; and
 a wireless communication network for establishing wireless communication between the smart folder and the manager terminal.

11. The system according to claim 10, wherein the manager terminal is provided with search fields, searches for digital contents matching a search keyword, and displays smart folders in which searched digital contents are stored.

12. The system according to claim 10, wherein user-registered fingerprints, registered in advance, are stored in the smart folder, and the manager terminal transmits and updates the user-registered fingerprints by smart folder.

13. The device according to claim 1, wherein the screen paper includes:
 a paper wireless communication unit for wirelessly communicating with the screen folder;
 a paper memory for storing digital contents;
 a paper touch screen panel provided on the screen paper to display digital contents and receive input of user's handling;
 a wireless tag on which a unique identification number of the screen paper is recorded; and a paper control unit for storing digital contents inputted through the paper touch screen panel and digital contents received from the screen folder in the paper memory, displaying the digital contents stored in the paper memory on the paper touch screen panel, and wirelessly transmitting the digital contents to the screen folder.

\* \* \* \* \*